United States Patent
Lu et al.

(10) Patent No.: US 12,050,927 B2
(45) Date of Patent: Jul. 30, 2024

(54) TECHNIQUES FOR CONCURRENTLY SUPPORTING VIRTUAL NUMA AND CPU/MEMORY HOT-ADD IN A VIRTUAL MACHINE

(71) Applicant: VMware LLC, Palo Alto, CA (US)

(72) Inventors: Xunjia Lu, Los Altos, CA (US); Bi Wu, Santa Clara, CA (US); Petr Vandrovec, Cupertino, CA (US); Haoqiang Zheng, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/317,827

(22) Filed: May 15, 2023

(65) Prior Publication Data

US 2023/0289207 A1    Sep. 14, 2023

Related U.S. Application Data

(63) Continuation of application No. 17/013,277, filed on Sep. 4, 2020, now Pat. No. 11,687,356.

(51) Int. Cl.
    *G06F 9/455*    (2018.01)
    *G06F 9/445*    (2018.01)
    *G06F 9/50*     (2006.01)
    *G06F 12/02*    (2006.01)

(52) U.S. Cl.
    CPC ...... *G06F 9/45558* (2013.01); *G06F 9/44505* (2013.01); *G06F 9/5077* (2013.01); *G06F 12/0238* (2013.01); *G06F 2009/45583* (2013.01); *G06F 2009/45591* (2013.01); *G06F 2209/5022* (2013.01); *G06F 2212/2542* (2013.01)

(58) Field of Classification Search
    CPC ................................................... G06F 9/45558
    See application file for complete search history.

(56) References Cited

U.S. PATENT DOCUMENTS

| | | | |
|---|---|---|---|
| 10,896,060 B1 | 1/2021 | Sciarrino | |
| 2010/0174778 A1* | 7/2010 | Yuan ..................... | H04W 28/06 707/E17.011 |
| 2020/0042343 A1 | 2/2020 | Wang et al. | |
| 2022/0075637 A1 | 3/2022 | Lu et al. | |

* cited by examiner

*Primary Examiner* — Charlie Sun
(74) *Attorney, Agent, or Firm* — Quarles & Brady LLP (57) ABSTRACT

Techniques for concurrently supporting virtual non-uniform memory access (virtual NUMA) and CPU/memory hot-add in a virtual machine (VM) are provided. In one set of embodiments, a hypervisor of a host system can compute a node size for a virtual NUMA topology of the VM, where the node size indicates a maximum number of virtual central processing units (vCPUs) and a maximum amount of memory to be included in each virtual NUMA node. The hypervisor can further build and expose the virtual NUMA topology to the VM. Then, at a time of receiving a request to hot-add a new vCPU or memory region to the VM, the hypervisor can check whether all existing nodes in the virtual NUMA topology have reached the maximum number of vCPUs or maximum amount of memory, per the computed node size. If so, the hypervisor can create a new node with the new vCPU or memory region and add the new node to the virtual NUMA topology.

21 Claims, 5 Drawing Sheets

TECHNIQUES FOR CONCURRENTLY SUPPORTING VIRTUAL NUMA AND CPU/MEMORY HOT-ADD IN A VIRTUAL MACHINE

CROSS-REFERENCES TO RELATED APPLICATIONS

This present application is a continuation of U.S. patent application Ser. No. 17/013,277 filed Sep. 4, 2020 and entitled "Techniques for Concurrently Supporting Virtual NUMA and CPU/Memory Hot-Add in a Virtual Machine" the entire contents of which are incorporated herein by reference for all purposes.

BACKGROUND

CPU hot-add (sometimes referred to as CPU hot-plug) and memory hot-add are features in modern hypervisors that enable a user to add virtual processing cores (i.e., vCPUs) and memory (i.e., RAM) respectively to running virtual machines (VMs). These features are useful in scenarios where, e.g., a business-critical VM begins slowing down due to a lack of sufficient compute and/or memory resources, because they allow additional vCPUs and RAM to be dynamically added to the VM without requiring a VM restart.

Virtual non-uniform memory access (i.e., "virtual NUMA") is another feature in modern hypervisors that enables a hypervisor to build and expose a virtual NUMA topology to a VM, which is a virtual construct that organizes the VM's vCPUs and memory into groupings known as virtual NUMA nodes. If a given memory region and vCPU are part of the same virtual NUMA node, that memory region is considered local to the vCPU, which means the vCPU can access it with relatively low latency. In contrast, if a given memory region and vCPU are part of different virtual NUMA nodes, that memory region is considered remote from the vCPU, which means the vCPU's access to it will be slower than local memory. Generally speaking, at the time of building a virtual NUMA topology for a VM, a hypervisor will attempt to structure the virtual NUMA topology such that the vCPUs and memory regions in each virtual NUMA node fit within a single physical NUMA node of the physical NUMA topology of the host system on which the VM runs. In addition, the hypervisor will attempt to map virtual NUMA nodes to physical NUMA nodes in a manner that prevents a virtual NUMA node from spanning across multiple physical NUMA nodes. This allows the guest operating system (OS) and applications of the VM (assuming they are NUMA-aware) to make scheduling decisions based on the virtual NUMA topology that result in optimal performance (i.e., minimized remote memory access) when executed on the physical NUMA topology.

One limitation with existing hypervisors is that they do not allow virtual NUMA to be used in conjunction with CPU hot-add and memory hot-add. In particular, if CPU hot-add is enabled for a given VM, existing hypervisors will not build and expose a virtual NUMA topology to the VM; instead, the VM will only see a single virtual NUMA node that includes all of the VM's vCPUs and memory, regardless of the VM's characteristics and the underlying physical NUMA topology. This limitation is problematic because virtual NUMA, CPU hot-add, and memory hot-add are all important tools for achieving and maintaining high performance in business-critical, compute-intensive VMs.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques that can be implemented by a hypervisor for concurrently supporting virtual NUMA and CPU/memory hot-add in a VM. At a high level, these techniques involve computing a "virtual NUMA node size" for the VM (i.e., a maximum number of vCPUs and maximum amount of RAM to be included in each of the VM's virtual NUMA nodes), creating a virtual NUMA topology for the VM based on the computed virtual NUMA node size and the VM's provisioned vCPUs and memory, and exposing the virtual NUMA topology to the VM. Then, when the hypervisor receives a request to hot-add a new vCPU or new memory to the VM, the hypervisor can check whether an existing virtual NUMA node in the VM's virtual NUMA topology is below its maximum vCPU or memory limit (per the computed virtual NUMA node size). If the answer is yes, the hypervisor can add the new vCPU or new memory to that existing virtual NUMA node in order to fulfill the hot-add request. However if the answer is no, the hypervisor can bring online an additional virtual NUMA node (which includes the new vCPU or new memory) in order to fulfill the hot-add request, thereby effectively hot-adding a brand new node to the virtual NUMA topology.

The foregoing and other aspects of the present disclosure are described in further detail below.

2. Example Host System

Figure 1:
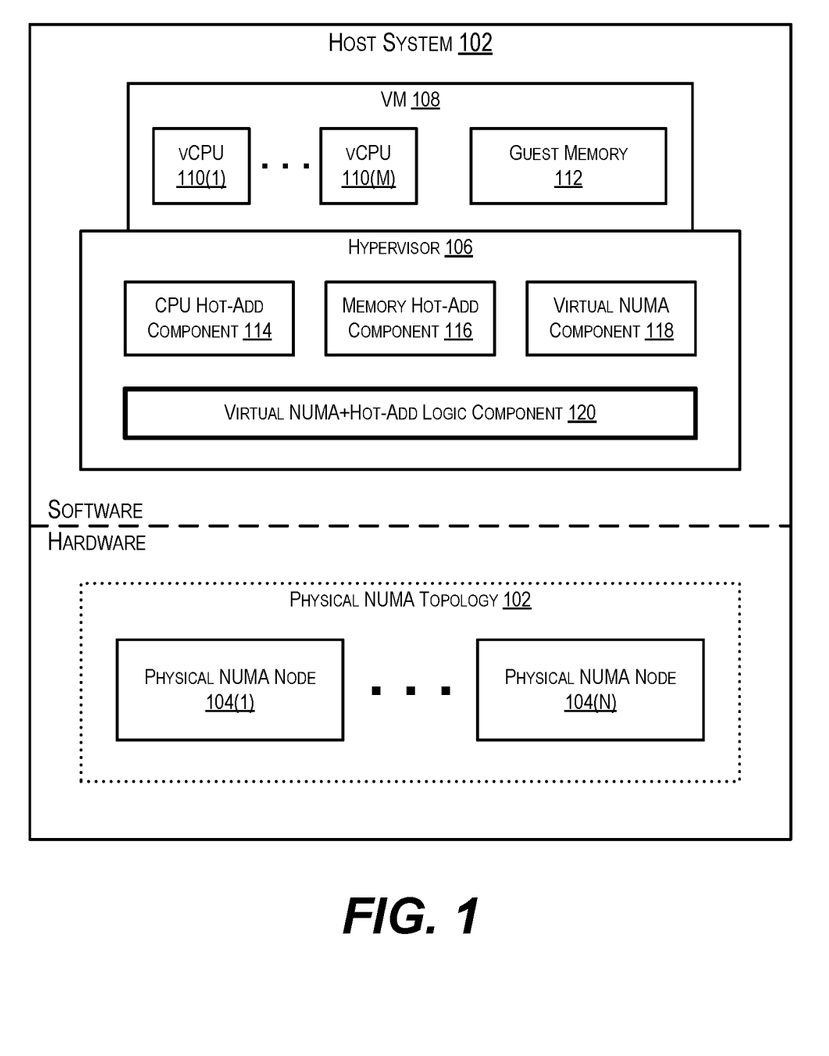
FIG. 1 depicts an example host system according to certain embodiments.

FIG. 1 is a simplified block diagram of an example host system 100 in accordance with certain embodiments of the present disclosure. Host system 100 includes, in hardware, a physical NUMA topology 102 comprising a number of physical NUMA nodes 104(1)-(N). Each physical NUMA node 104 can correspond to a CPU package/complex of host system 100 and can include one or more physical processing cores of the CPU package/complex and a locally-attached physical memory (e.g., DRAM) (not shown).

Host system 100 further includes, in software, a hypervisor 106 and a VM 108. VM 108 comprises a number of vCPUs 110(1)-(M) and a guest memory 112 which represent virtualized compute and memory resources that are made available to VM 108 by hypervisor 106. Although only a single VM is depicted for purposes of illustration, any number of VMs (subject to hardware constraints) may be run on host system 100.

Hypervisor 106 comprises, among other things, a CPU hot-add component 114, a memory hot-add component 116, and a virtual NUMA component 118. With CPU and memory hot-add components 114 and 116, hypervisor 106 can turn on CPU and memory hot-add functionality for VM 108 and thereby enable a user to dynamically add vCPUs and/or memory to the VM during its runtime. With virtual NUMA component 118, hypervisor 106 can build and expose a virtual NUMA topology to VM 108 whose nodes generally map to physical NUMA nodes 104(1)-(N) of physical NUMA topology 102. By exposing this virtual NUMA topology to VM 108, NUMA-aware processes in the VM can understand which portions of guest memory 112 are local to and remote from each vCPU 110 and schedule their operations in a way that minimizes remote memory access across the virtual NUMA nodes (and thus across physical NUMA nodes 104(1)-(N)), potentially resulting in improved performance.

Figure 2:
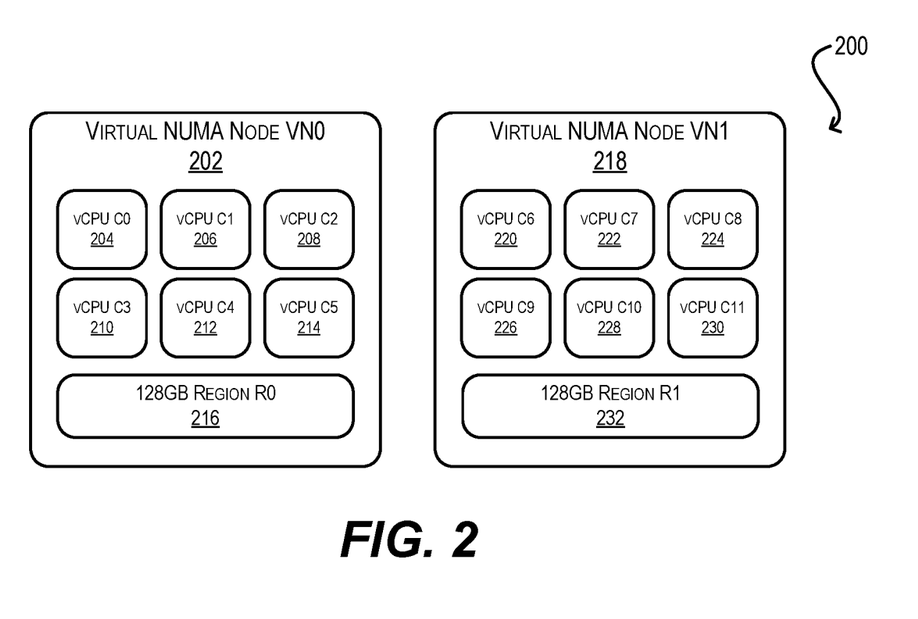
FIG. 2 depicts an example virtual NUMA topology.

By way of example, assume that physical NUMA topology 102 of host system 100 includes two physical NUMA nodes PN0 and PN1, each with eight physical processing cores and 128 GB of locally-attached DRAM. Further assume that VM 108 is provisioned with twelve vCPUs C0-C11 and 256 GB of guest memory. In this scenario, hypervisor 106 can build and expose, via virtual NUMA component 118, a virtual NUMA topology 200 for VM 108 (as shown in FIG. 2) that includes (1) a first virtual NUMA node VN0 (reference numeral 202) comprising six vCPUs C0-C5 (reference numerals 204-214) and a first 128 GB memory region R0 (reference numeral 216), and (2) a second virtual NUMA node VN1 (reference numeral 218) comprising the remaining six vCPUs C6-C11 (reference numerals 220-230) and a second 128 GB memory region R1 (reference numeral 232). Upon building and exposing this virtual NUMA topology to VM 108, hypervisor 106 can map virtual NUMA nodes VN0 and VN1 to the two physical NUMA nodes in a one-to-one fashion, thereby ensuring that local memory accesses made by VM 108 in the context of its virtual NUMA topology are also local in the context of physical NUMA topology 102.

As noted in the Background section, one limitation with existing hypervisors is that they do not allow virtual NUMA to be used in conjunction with CPU hot-add and memory hot-add; thus, if CPU hot-add is enabled for a given VM, virtual NUMA will be automatically disabled for that VM. This is problematic because CPU hot-add is generally most useful for business-critical, compute-intensive VMs, which are the same types of VMs that typically want to take advantage of the performance benefits offered by virtual NUMA. In addition, while some existing hypervisors allow memory hot-add to be used in conjunction with virtual NUMA, the memory hot-add behavior in these existing hypervisors with virtual NUMA enabled is very limited (partially due to the inability to also hot-add vCPUs).

To address the foregoing and other similar issues, host system 100 further includes a novel "virtual NUMA+hot-add logic" component 120 within hypervisor 106. As detailed in the sections that follow, virtual NUMA+hot-add logic 120 can enable hypervisor 106 to dynamically add, as needed, brand new virtual NUMA nodes to the virtual NUMA topology of VM 108 at the time of hot-adding vCPUs and/or memory. This allows hypervisor 106 to concurrently support virtual NUMA and CPU/memory hot-add in VM 108 in a logical and useful manner, and thus eliminates the need for VM users/administrators to choose one feature at the exclusion of the other(s).

It should be appreciated that FIG. 1 is illustrative and not intended to limit embodiments of the present disclosure. For example, although FIG. 1 depicts a particular arrangement of entities/components within host system 100, other arrangements are possible (e.g., the functionality attributed to a particular entity/component may be split into multiple entities/components, entities/components may be combined, etc.). In addition, each entity/component may include sub-components or implement functionality that is not specifically described. One of ordinary skill in the art will recognize other variations, modifications, and alternatives.

3. High-Level Workflow

Figure 3A:
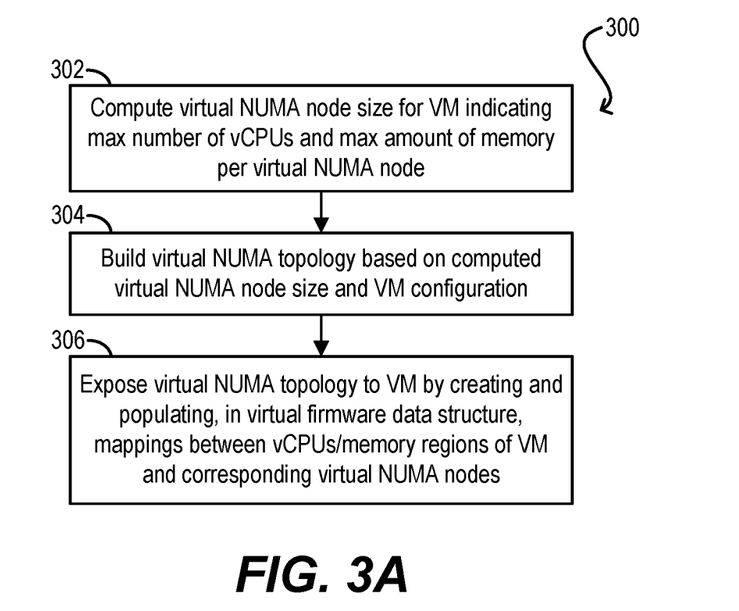
FIGS. 3A and 3B depict a high-level workflow for supporting virtual NUMA and CPU/memory hot-add according to certain embodiments.
Figure 3B:
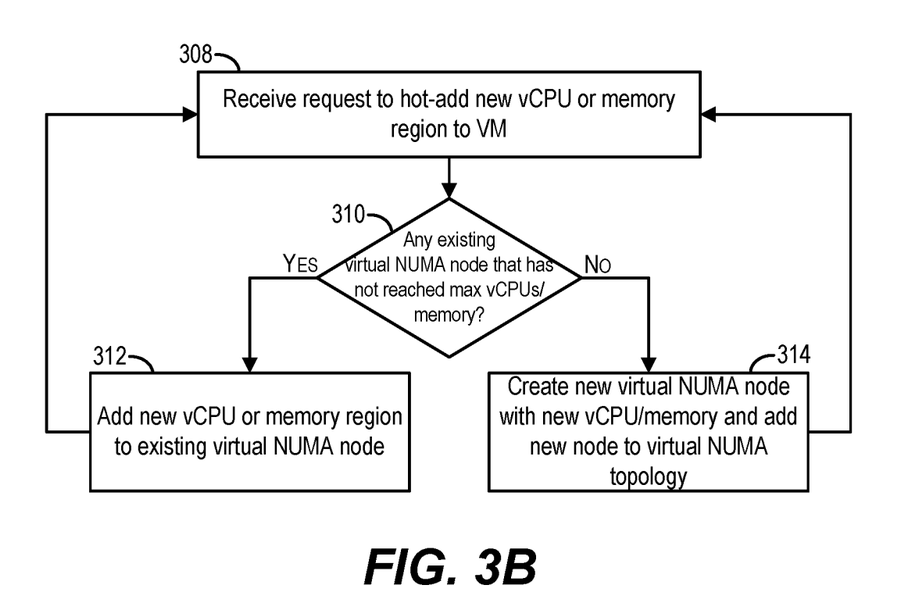

FIGS. 3A and 3B depict a high-level workflow 300 that may be executed by hypervisor 106 of FIG. 1, in accordance with its virtual NUMA+hot-add logic 120, for concurrently supporting virtual NUMA and CPU/memory hot-add in VM 108 according to certain embodiments. In particular, the workflow portion shown in FIG. 3A correspond to steps that may be executed by hypervisor 106 at the time of powering on VM 108 and the workflow portion shown in FIG. 3B correspond to steps that may be executed by hypervisor 106 at the time of receiving and processing a vCPU or memory hot-add request.

Starting with block 302 of FIG. 3A, hypervisor 106 can compute a virtual NUMA node size for VM 108 that indicates the maximum number of vCPUs and the maximum amount of memory to be included in each virtual NUMA node of the VM's virtual NUMA topology. In a particular embodiment, hypervisor 106 can perform this computation as part of building the virtual NUMA topology using its existing virtual NUMA component 118, such that the virtual NUMA node size is set as the size of the first virtual NUMA node (i.e., node 0) in the determined topology. In other embodiments, hypervisor 106 can perform this computation prior to building out the virtual NUMA topology, based on the configuration of VM 108 (e.g., the number of provisioned vCPUs and amount of provisioned memory) and the details of physical NUMA topology 102 of host system 100 (e.g., number of physical NUMA nodes, number of physical processing cores per node, amount of local memory per node).

At block 304, hypervisor 106 can build the virtual NUMA topology for VM 108 (if not already done so) using the computed virtual NUMA node size and the VM's configuration. Hypervisor 106 can then expose the virtual NUMA topology to VM 108, thereby enabling the VM's guest OS and applications to consume this information and implement appropriate NUMA-aware optimizations (block 306). As part of block 306, hypervisor 106 can create a set of mappings that associate each vCPU and memory region of VM 108 with a corresponding virtual NUMA node in the virtual NUMA topology and populate these mappings in a virtual firmware data structure of VM 108 (e.g., an Advanced Configuration and Power Interface (ACPI) table) that is visible to and consumable by the guest OS.

Turning now to FIG. 3B, at block 308 hypervisor 106 can receive (from, e.g., a user or administrator of VM 108) a request to hot-add a new vCPU or a new memory region to VM 108. Upon receiving this request, hypervisor 106 can check whether any existing virtual NUMA node in the VM's virtual NUMA topology has not yet reached its maximum vCPU or memory limit, per the virtual NUMA node size computed at block 302 of FIG. 3A (block 310). The particular manner in which hypervisor 106 performs this check can vary depending on the implementation. For example, in a particular implementation pertaining to CPU hot-add, hypervisor 106 can determine whether any existing virtual NUMA node is associated with a "placeholder" vCPU in the virtual firmware data structure which indicates that the virtual NUMA node is not yet full (described in section (4) below).

If the answer at block 310 is yes, hypervisor 106 can add the new vCPU or new memory region to that existing virtual NUMA node, thereby fulfilling the hot-add request (block 312). However, if the answer at block 310 is no (which means that all existing virtual NUMA nodes are full), hypervisor 106 can create a brand new virtual NUMA node comprising the new vCPU or new memory region and add that new node to the virtual NUMA topology (thereby making the new virtual NUMA node visible to VM 108) (block 314). Thus, in this case, hypervisor 106 can effectively expand the size of the VM's virtual NUMA topology in order to fulfill the hot-add request. Finally, upon completing either block 312 or block 314, hypervisor 106 can return to block 308 in order to receive and process additional hot-add requests.

Figure 4:
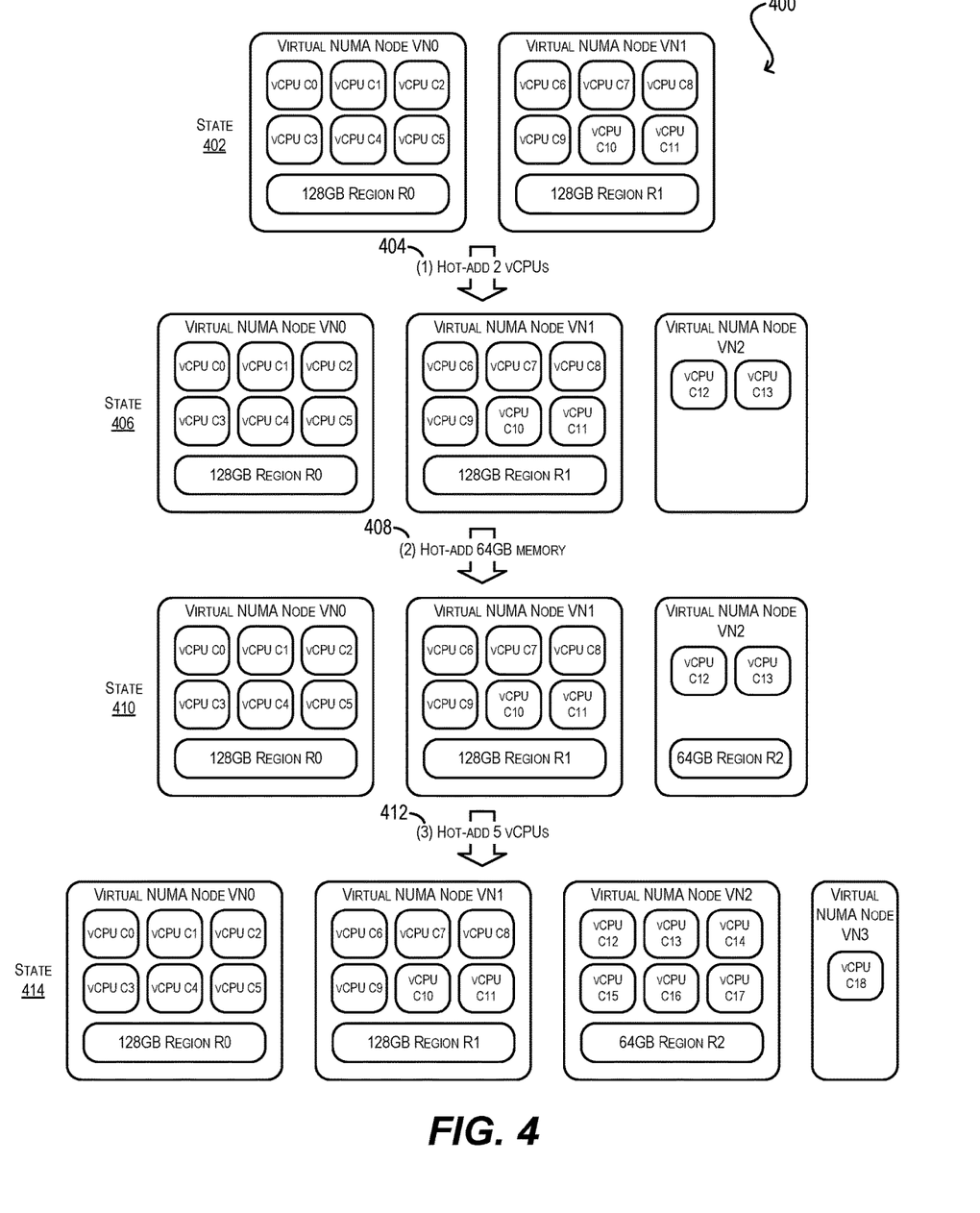
FIG. 4 depicts a sequence of virtual NUMA topology state changes per the processing of workflow 300 according to certain embodiments.

To further clarify the foregoing, FIG. 4 depicts an example sequence of virtual NUMA topology state changes (400) that may be experienced by VM 108 in response to CPU/memory hot-add requests, per the operation of workflow 300. At initial state 402, the virtual NUMA topology is identical topology 200 of FIG. 2 and thus includes a first virtual NUMA node VN0 including vCPUs C0-C5 and a first 128 GB memory region R0 and a second virtual NUMA node VN1 including vCPUs C6-C11 and a second 128 GB memory region R1. Note that in this scenario, the virtual NUMA node size is six vCPUs and 128 GB, per the size of node VN0.

At step (1) (reference numeral 404), two new vCPUs are hot-added. Because there is no existing virtual NUMA node with less than six vCPUs (which is the per-node limit), the virtual NUMA topology changes to a second state 406 that includes a new virtual NUMA node VN2 with two new vCPUs C12 and C13 (and no memory).

Then, at step (2) (reference numeral 408), 64 GB of new memory is hot-added. Because virtual NUMA node VN2 can accommodate this new memory (i.e., its current memory configuration is below the per-node limit of 128 GB), the virtual NUMA topology changes to a third state 410 in which a 64 GB memory region R2 is added to node VN2.

Finally, at step (3) (reference numeral 412), an additional five new vCPUs are hot-added. Because virtual NUMA node VN2 can accommodate four of these new vCPUs, the virtual NUMA topology changes to a fourth state 414 in which vCPUs C14-17 are added to VN2. In addition, a new virtual NUMA node VN3 is created to hold the final new vCPU C18.

Although workflow 300 of FIG. 3 and the example state changes shown in FIG. 4 assume that new resources are hot-added to VM 108 on a per-vCPU or per-memory region basis, in some embodiments a user may request the hot-add of an entirely new virtual NUMA node to VM 108's virtual NUMA topology. In these embodiments, upon receiving such a request, hypervisor 106 can add a new virtual NUMA node that is fully populated with the maximum number of vCPUs and memory allowed for the node (per the virtual NUMA node size parameter).

Further, in certain embodiments logic component 120 of hypervisor 106 can enable the hot-removal of vCPUs, memory regions, and/or fully or partially populated virtual NUMA nodes from VM 108's virtual NUMA topology (in addition to hot-add). In the scenario where one or more vCPUs or memory regions are hot-removed from a given virtual NUMA node, that entire node can be automatically deleted from the virtual NUMA topology if the hot-removal causes the node to become empty.

4. Virtual NUMA+CPU Hot-Add Workflow Using Placeholder Mappings

Figure 5A:
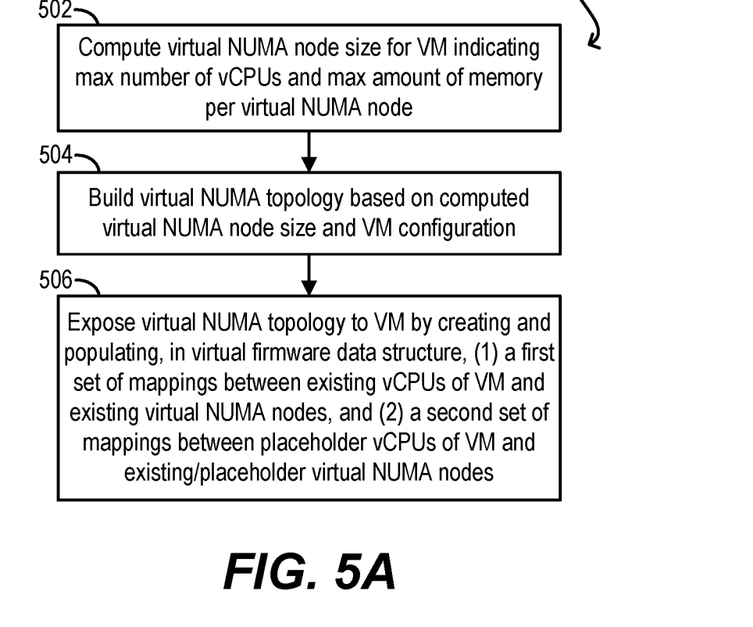
FIGS. 5A and 5B depict a workflow for supporting virtual NUMA and CPU hot-add using placeholder virtual NUMA mappings according to certain embodiments.
Figure 5B:
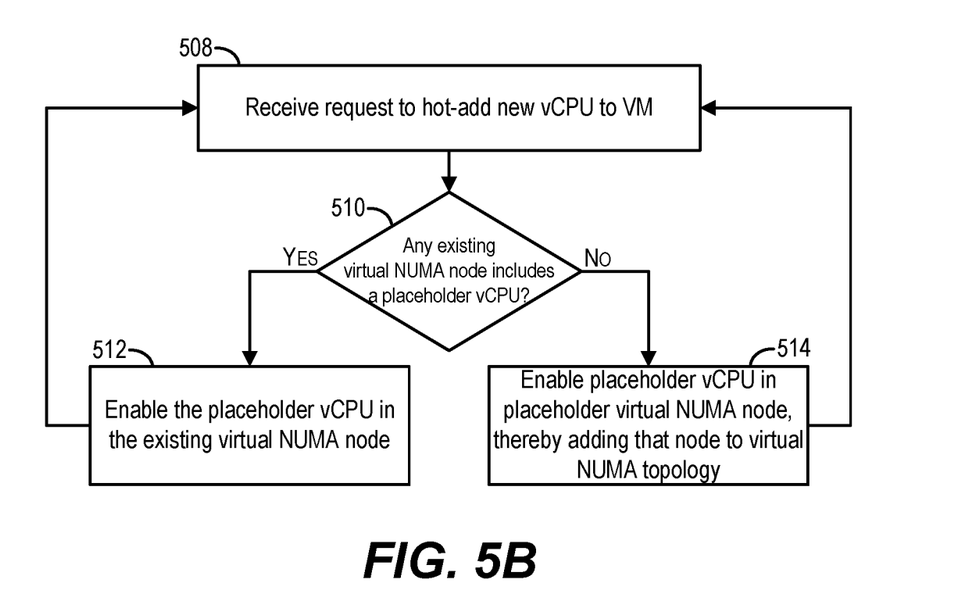

FIGS. 5A and 5B depict a version of workflow 300 (i.e., workflow 500) that is specific to CPU hot-add and that employs the concept of placeholder vCPU-to-virtual NUMA node mappings in the virtual firmware of VM 108 to aid hypervisor 106 in determining where to add new (i.e., hot-added) vCPUs in the VM's virtual NUMA topology. Like FIGS. 3A and 3B, the workflow portion shown in FIG. 5A correspond to steps that may be executed by hypervisor 106 at the time of powering on VM 108 and the workflow portion shown in FIG. 5B correspond to steps that may be executed by hypervisor 106 at the time of receiving and processing a vCPU hot-add request.

Starting with FIG. 5A, hypervisor 106 can compute a virtual NUMA node size for VM 108 (block 502), build a virtual NUMA topology (block 504), and expose the virtual NUMA topology to VM 108 (block 506) in a manner that is similar to blocks 302-306 of workflow 300. However, as part of block 506, rather than simply creating and populating a set of mappings in the VM's virtual firmware that associate each existing vCPU and memory region of VM 108 with a corresponding existing virtual NUMA node in the virtual NUMA topology, hypervisor 106 can also create/populate a set of mappings that associate "placeholder" vCPUs (i.e., vCPUs that are not currently present in the virtual NUMA topology) with corresponding existing or placeholder virtual NUMA nodes, based on the maximum number of vCPUs supported by hypervisor 106.

For example, assume hypervisor 106 supports a maximum of 24 vCPUs per VM and builds an initial virtual NUMA topology for VM 108 that us identical to topology 200 of FIG. 2 (i.e., two virtual NUMA nodes VN0 and VN1, each with six vCPUs C0-C5 and C6-C11 respectively). In this scenario, hypervisor 106 can create/populate a first set of mappings that map existing vCPUs C0-C11 to existing virtual NUMA nodes VN0 and VN1 (along with an "enabled" indicator indicating that these vCPUs are present in the topology) as shown below:

C0 (enabled)→VN0
    C1 (enabled)→VN0
    C2 (enabled)→VN0
    C3 (enabled)→VN0
    C4 (enabled)→VN0
    C5 (enabled)→VN0
    C6 (enabled)→VN1
    C7 (enabled)→VN1
    C8 (enabled)→VN1
    C9 (enabled)→VN1]
    C10 (enabled)→VN1
    C11 (enabled)→VN1

Listing 1

In addition, hypervisor 106 can create/populate a second set of mappings that map placeholder vCPUs C12-C23

(along with a "disabled" indicator indicating that these vCPUs do not exist yet in the virtual NUMA topology) to placeholder virtual NUMA nodes VN2 and VN3 as shown below:

C12 (disabled)→VN2
C13 (disabled)→VN2
C14 (disabled)→VN2
C15 (disabled)→VN2
C16 (disabled)→VN2
C17 (disabled)→VN2
C18 (disabled)→VN3
C19 (disabled)→VN3
C20 (disabled)→VN3
C21 (disabled)→VN3
C22 (disabled)→VN3
C23 (disabled)→VN3

Listing 2

Placeholder vCPUs C12-C23 are spread across two placeholder virtual NUMA nodes because the maximum number of vCPUs per node is six per the virtual NUMA node size of topology 200. Further, a total of 24 mappings are created/populated because the maximum number of vCPUs supported by hypervisor 106 in this example is 24 as mentioned above.

Turning now to FIG. 5B, at block 508 hypervisor 106 can receive (from, e.g., a user or administrator of VM 108) a request to hot-add a new vCPU to VM 108. Upon receiving this request, hypervisor 106 can check whether any of the existing virtual NUMA nodes in the virtual NUMA topology of VM 108 include a placeholder (i.e., disabled) vCPU, per the mappings populated in the VM's virtual firmware data structure at block 506 of FIG. 5A (block 510). If the answer is yes, hypervisor 106 can enable that placeholder vCPU by changing is corresponding indicator from "disabled" to "enabled," thereby causing VM 108 to see it as a newly available vCPU and fulfilling the vCPU hot-add request (block 512).

However if the answer at block 510 is no, hypervisor 106 can enable a placeholder vCPU in a placeholder virtual NUMA node, such as vCPU C12 in virtual NUMA node VN2 in the example above (block 514). Through this operation, hypervisor 106 can effectively add virtual NUMA node VN2 (with vCPU C12) as a brand new node in the VM's virtual NUMA topology. Finally, upon completing either block 512 or block 514, hypervisor 106 can return to block 508 in order to receive and process additional vCPU hot-add requests. Note that with this approach, hypervisor 106 can continue hot-adding new vCPUs (and corresponding virtual NUMA nodes) to VM 108 until all of the placeholder mappings in the VM's virtual firmware have been exhausted. Further, as with workflow 300 of FIG. 3, in certain embodiments workflow 500 can support the hot-adding of fully populated virtual NUMA nodes, as well as the hot-removal of vCPUs, memory regions, and/or virtual NUMA nodes from the virtual NUMA topology.

5. Supporting Live Migration

One complication with the foregoing techniques is that, at the time VM 108 is live migrated from host system 100 to another (i.e., destination) host system, its virtual NUMA topology should be preserved on the destination host system so that any guest-level NUMA optimizations made by the guest processes of the VM remain valid after migration. To ensure that this is the case, during the live migration process, hypervisor 106 of host system 100 can take a checkpoint of the VM's virtual NUMA topology (e.g., the virtual firmware mappings of vCPUs and memory regions to virtual NUMA node IDs) and transmit this information to destination host system. The hypervisor on the destination host system can use the checkpoint information to transparently reconstruct the virtual NUMA topology for the migrated VM on the destination host side and subsequently place the virtual NUMA nodes on the destination host's physical NUMA nodes for optimal performance.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
   computing, by a hypervisor of a host system, a node size for a virtual non-uniform memory access (NUMA) topology of a virtual machine (VM), the node size indicating a maximum number of virtual central processing units (vCPUs) and a maximum amount of memory to be included in each node of the virtual NUMA topology;
   building, by the hypervisor, the virtual NUMA topology based on the computed node size and a configuration of the VM, the virtual NUMA topology including one or more existing nodes and one or more placeholder nodes; and
   exposing, by the hypervisor, the virtual NUMA topology to the VM, the exposing comprising:
      populating, in a virtual firmware data structure of the VM, a first set of mappings between one or more existing vCPUs of the VM and the one or more existing nodes; and
      populating, in the virtual firmware data structure, a second set of mappings between one or more placeholder vCPUs and the one or more existing nodes or the one or more placeholder nodes.

2. The method of claim 1 wherein in the second set of mappings, each placeholder vCPU is associated with an indicator indicating that the placeholder vCPU is disabled in the virtual NUMA topology.

3. The method of claim 2 further comprising:
   receiving a request to hot-add a new vCPU to the VM;
   in response to the request, determining, based on the virtual firmware data structure, whether any placeholder vCPUs are mapped to an existing node.

4. The method of claim 3 further comprising, upon determining that a placeholder vCPU is mapped to an existing node:
   changing the placeholder vCPU's associated indicator in the second set of mappings to indicate that the placeholder vCPU is now enabled in the virtual NUMA topology.

5. The method of claim 3 further comprising, upon determining that no placeholder vCPUs are mapped to an existing node:
   identifying a placeholder vCPU that is mapped to a placeholder node; and
   changing the placeholder vCPU's associated indicator in the second set of mappings to indicate that the placeholder vCPU is now enabled in the virtual NUMA topology, the changing causing the placeholder node to be added as a new existing node to the virtual NUMA topology.

6. The method of claim 1 further comprising:
   receiving a request to hot-remove an existing vCPU from the VM; and
   in response to the request, removing, from the virtual firmware data structure, a mapping between the existing vCPU and a corresponding existing node.

7. The method of claim 6 further comprising:
   determining that hot-removal of the existing vCPU causes the corresponding existing node to become empty; and
   deleting the corresponding existing node from the virtual NUMA topology.

8. A non-transitory computer readable storage medium having stored thereon instructions executable by a hypervisor of a host system, the instructions embodying a method comprising:
   computing a node size for a virtual non-uniform memory access (NUMA) topology of a virtual machine (VM), the node size indicating a maximum number of virtual central processing units (vCPUs) and a maximum amount of memory to be included in each node of the virtual NUMA topology;
   building the virtual NUMA topology based on the computed node size and a configuration of the VM, the virtual NUMA topology including one or more existing nodes and one or more placeholder nodes; and
   exposing the virtual NUMA topology to the VM, the exposing comprising:
      populating, in a virtual firmware data structure of the VM, a first set of mappings between one or more existing vCPUs of the VM and the one or more existing nodes; and
      populating, in the virtual firmware data structure, a second set of mappings between one or more placeholder vCPUs and the one or more existing nodes or the one or more placeholder nodes.

9. The non-transitory computer readable storage medium of claim 8 wherein in the second set of mappings, each placeholder vCPU is associated with an indicator indicating that the placeholder vCPU is disabled in the virtual NUMA topology.

10. The non-transitory computer readable storage medium of claim 9 wherein the method further comprises:
    receiving a request to hot-add a new vCPU to the VM;
    in response to the request, determining, based on the virtual firmware data structure, whether any placeholder vCPUs are mapped to an existing node.

11. The non-transitory computer readable storage medium of claim 10 wherein the method further comprises, upon determining that a placeholder vCPU is mapped to an existing node:
    changing the placeholder vCPU's associated indicator in the second set of mappings to indicate that the placeholder vCPU is now enabled in the virtual NUMA topology.

12. The non-transitory computer readable storage medium of claim 10 wherein the method further comprises, upon determining that no placeholder vCPUs are mapped to an existing node:
    identifying a placeholder vCPU that is mapped to a placeholder node; and
    changing the placeholder vCPU's associated indicator in the second set of mappings to indicate that the placeholder vCPU is now enabled in the virtual NUMA topology, the changing causing the placeholder node to be added as a new existing node to the virtual NUMA topology.

13. The non-transitory computer readable storage medium of claim 8 wherein the method further comprises:
   receiving a request to hot-remove an existing vCPU from the VM; and
   in response to the request, removing, from the virtual firmware data structure, a mapping between the existing vCPU and a corresponding existing node.

14. The non-transitory computer readable storage medium of claim 13 wherein the method further comprises:
   determining that hot-removal of the existing vCPU causes the corresponding existing node to become empty; and
   deleting the corresponding existing node from the virtual NUMA topology.

15. A host system comprising:
   a hypervisor; and
   a non-transitory computer readable medium having stored thereon program code that, when executed by the hypervisor, causes the hypervisor to:
   compute a node size for a virtual non-uniform memory access (NUMA) topology of a virtual machine (VM), the node size indicating a maximum number of virtual central processing units (vCPUs) and a maximum amount of memory to be included in each node of the virtual NUMA topology;
   build the virtual NUMA topology based on the computed node size and a configuration of the VM, the virtual NUMA topology including one or more existing nodes and one or more placeholder nodes; and
   expose the virtual NUMA topology to the VM, the exposing comprising:
      populate, in a virtual firmware data structure of the VM, a first set of mappings between one or more existing vCPUs of the VM and the one or more existing nodes; and
      populate, in the virtual firmware data structure, a second set of mappings between one or more placeholder vCPUs and the one or more existing nodes or the one or more placeholder nodes.

16. The host system of claim 15 wherein in the second set of mappings, each placeholder vCPU is associated with an indicator indicating that the placeholder vCPU is disabled in the virtual NUMA topology.

17. The host system of claim 16 wherein the program code further causes the hypervisor to:
   receive a request to hot-add a new vCPU to the VM;
   in response to the request, determine, based on the virtual firmware data structure, whether any placeholder vCPUs are mapped to an existing node.

18. The host system of claim 17 wherein the program code further causes the hypervisor to, upon determining that a placeholder vCPU is mapped to an existing node:
   change the placeholder vCPU's associated indicator in the second set of mappings to indicate that the placeholder vCPU is now enabled in the virtual NUMA topology.

19. The host system of claim 17 wherein the program code further causes the hypervisor to, upon determining that no placeholder vCPUs are mapped to an existing node:
   identify a placeholder vCPU that is mapped to a placeholder node; and
   change the placeholder vCPU's associated indicator in the second set of mappings to indicate that the placeholder vCPU is now enabled in the virtual NUMA topology, the changing causing the placeholder node to be added as a new existing node to the virtual NUMA topology.

20. The host system of claim 15 wherein the program code further causes the hypervisor to:
   receive a request to hot-remove an existing vCPU from the VM; and
   in response to the request, remove, from the virtual firmware data structure, a mapping between the existing vCPU and a corresponding existing node.

21. The host system of claim 20 wherein the program code further causes the hypervisor to:
   determine that hot-removal of the existing vCPU causes the corresponding existing node to become empty; and
   delete the corresponding existing node from the virtual NUMA topology.

* * * * *